United States Patent [19]

Godly

[11] Patent Number: 4,826,535

[45] Date of Patent: May 2, 1989

[54] STAIN-FREE TEMPERA PAINTS

[75] Inventor: Gordon Godly, Aberdeen, N.J.

[73] Assignee: Rich Art Color Company, Inc., Lodi, N.J.

[21] Appl. No.: 180,561

[22] Filed: Apr. 12, 1988

[51] Int. Cl.$^4$ .............................. C08L 1/00; C08K 5/00
[52] U.S. Cl. ..................................... 106/209; 106/499; 106/501
[58] Field of Search ................... 106/499, 501, 193 J, 106/193 P, 209

[56] References Cited

U.S. PATENT DOCUMENTS

| | | | |
|---|---|---|---|
| 2,699,401 | 1/1955 | Grossi | 106/193 D |
| 2,764,496 | 9/1956 | Vogel et al. | 106/158 |
| 2,822,281 | 2/1958 | Masley | 106/208 |
| 3,438,914 | 4/1969 | Krockenberger | 106/50 |
| 3,821,008 | 6/1974 | Jordan et al. | 106/209 |
| 4,229,329 | 10/1980 | Bennett | 524/44 |

Primary Examiner—Prince E. Willis
Assistant Examiner—Christine A. Skane
Attorney, Agent, or Firm—Gottlieb, Rackman & Reisman

[57] ABSTRACT

A tempera paint composition which is easily removed from clothing during normal washing is provided. The composition includes selected "exotic" pigments which are non-substantive to clothing fibers. The composition also includes a carbon dioxide liberating substance which, upon contact with water when a stained-garment is washed, produces carbon dioxide which then lifts the paint from the clothing fibers. The composition further includes a thickener which gives non-flow characteristics to the paint and a opacifying agent which causes "trapping" of the pigment particles in the skeletal structure.

21 Claims, No Drawings

STAIN-FREE TEMPERA PAINTS

DESCRIPTION

BACKGROUND

This invention relates to chemical coatings of the type generally known as water-based paints, and more particularly to water-based paints falling within the category of tempera paints.

Water-based paints have been used for years and various types of such paints are commercially available. Water-based paints are especially suitable for use by educational organizations such as kindergarten, nursery, elementary and high schools, since they are inexpensive to prepare and may be easily washed from the user's hands and arms by the use of soap and water.

The types of water-based paints known as tempera paints exhibit a variety of desirable properties including color-strength, brightness, opacity, adhesion permanence, absence of cracking, and lack of odor. However, conventional tempera paints have a tendency to stain permanently the textile fabrics from which the user's clothing is commonly fabricated. It would therefore be desirable to provide a tempera paint which may be easily washed off an article of clothing using standard detergents and cleaners.

Accordingly, it is an object of the invention to provide a tempera paint which will not permanently stain articles of clothing.

It is another object of the invention to provide a tempera paint with a relatively high surface tension so as to prevent the paint from penetrating into clothing fibers.

Yet another object of the invention is to provide a tempera paint which avoids the use of pigment dispersants and other agents which condition the surface of fabrics for allowing paint retention.

Still a further object of the invention is to provide a tempera paint having a relatively small particle size, so that migration of the particles out of the fabric of the clothing garment during washing is facilitated.

Yet a further object of the invention is to provide a tempera paint which has reduced flow characteristics.

Still other objects and advantages of the invention will in part be obvious and will in part be apparent from the following description.

SUMMARY OF THE INVENTION

Generally speaking, in accordance with the invention a tempera paint composition which is easily removed by washing from the fibers of clothing garments is provided. The composition includes carefully selected "exotic" pigments, which are not normally used in paint compositions, and which are non-substantive to cotton and polyester.

Particularly, the tempera paint of the invention is designed to have a higher surface tension than normal water based paint compositions, thereby preventing the penetration of the tempera paint into the fibers of a clothing garment. Higher surface tension is achieved by not including pigment dispersants or other surface active agents. Penetration is also minimized by using a thickener which gives non-flow characteristics to the paint and by "trapping" the fine pigment particles in the skeletal structure of an opacifying agent, which is also included in the paint composition. Furthermore, clays such as attapulgite may be added in order to reduce pigment mobility.

An essential ingredient of the composition is a carbon dioxide liberating substance such as sodium bicarbonate which, upon contact with water when a paint-stained clothing garment is washed, produces carbon dioxide which then lifts the tempera paint from the clothing fibers. A plasticizer is also an important ingredient, helping to prevent the paint from forming a hard film which may be difficult to wash out using typical detergent compositions.

The invention accordingly comprises the composition of matter possessing the characteristics, properties, and relation of components which will be exemplified in the composition hereafter described, and the scope of the invention will be indicated in the claims.

DETAILED DESCRIPTION OF THE PREFERRED EMBODIMENT

In accordance with the invention, an important ingredient of the composition is an "exotic" pigment, which is chosen for exhibiting a particular color. Suitable exotic pigments include D&C Yellow No. 5 (Pigment Yellow 100), Clarion Red (Pigment Orange 46), Barium Lithol (Pigment Red 49:1), D&C Blue No. 1 (Aluminum Lake), D&C Red No. 27 (Aluminum Lake) (Solvent Red 48), Victoria Blue Lake (Pigment Blue 1), Prussian Blue (Pigment Blue 27) and Lithol Rubine (Pigment Red 57).

Other pigments suitable for the invention which are slightly less effective that those listed above include D & C Yellow No. 6 (Aluminum Lake, Pigment Yellow 104), FD & C Blue No. 2 (Aluminum Lake, Pigment Blue 63), Acid Violet 4 BNS (Acid Violet 17), and Calcium Lithol (Pigment Red 49:2) and Titanium Dioxide (white).

The pigment chosen should be present in an amount between about 0.8 and 2.0 weight percent.

An essential ingredient of the composition in accordance with the invention is a carbon dioxide liberating substance, which is present in order to produce carbon dioxide during laundering and thus lift the paint from the clothing fibers. The carbon dioxide liberating substance must have a pH between 5.5 and 8.5, and is preferably an alkaline metal bicarbonate, such as sodium bicarbonate, potassium bicarbonate and strontium bicarbonate. A less desirable carbon dioxide liberating substance is ammonium carbamate. The carbon dioxide liberating substance should be present in the composition in an amount between about 0.5 and 2.0 weight percent.

Another essential ingredient is a pH buffer or water softener, which is present in an amount between 0.5 and 0.25 weight percent. The preferred pH buffer is sodium pyrophosphate. Other suitable pH buffers include disodium hydrogen phosphate, sodium hexametaphosphate and disodium dihydrogen pyrophosphate.

Another essential ingredient of the composition is a pigment extender or filler, which should be present in an amount between about 10 and 30 weight percent. The pigment extender functions to prevent the paint surface from being sticky. The preferred pigment extender is diatomaceous silica, which has a skeletal structure capable of holding pigment particles in its interstices and is present in an amount between about 10 and 15 weight percent. Other pigment extenders may be added to the diatomaceous silica in an amount between about 10 and 18 weight percent. These include silica clays, such as china clay, and non-clay extenders such as barium sulfate and calcium carbonate.

Another essential ingredient of the composition in accordance with the invention is a binder or adhesive, which enables the paint composition to stick to a surface during application. The preferred adhesive is a starch solution, and the adhesive should be present between about 5 and 50 weight percent. Other suitable substitutes include dextrin, acrylics, and natural gums.

The composition should also include a plasticizer, which helps to make the paint soft and porous. The preferred plasticizer is a glucose plasticizer in combination with a glycerine plasticizer which, although more costly than the glucose plasticizer, is included to confer controlled absorption of moisture from the air. Other suitable plasticizers include propylene glycol, ethylene glycol, invert sugar and fructose syrup.

The plasticizer component is present in an amount between about 5 and 15 weight percent, an amount which exceeds that normally included in conventional water based paints. The excess plasticizer insures that the paint surface remains soft, even several days after application, which is desirable so that the paint can be more easily washed from the user's clothes.

A preservative is also an essential ingredient of the composition. The preservative should be present in an amount between about 0.1 and 0.25 weight percent. The preservative is chosen from glutaraldehyde, benzoic acid, para -chloro-meta-xylenol and other phenolic derivatives.

The composition also may include various optional ingredients. One ingredient that is not critical is a liquid protein. Particularly, the liquid protein is not required to be present in the composition if the pigment used is easily dispersible and non skin-staining, as, for example, white or orange pigments.

The preferred liquid protein is a casein solution. Its function is to prevent the paint from staining the skin of the user; instead, the paint stains the protein itself. The liquid protein also serves as a stabilizer for pigment dispersion. Other suitable liquid proteins include keratin solution and albumin solution. If included in the composition, the liquid protein should be present in an amount between about 5 and 10 weight percent.

An opacifier is also an optional ingredient to be added to the composition of the invention. The opacifier functions to make the paint film opaque, rather than transparent. The preferred opacifier is titanium dioxide and the opacifier, if present, is present in an amount up to about 15 weight percent. Suitable substitutes for titanium dioxide as the opacifier include lithopone, barium sulfate and zinc oxide.

The composition may also include a paint thickener, which is preferably present in an amount between about 0.6 and 3.5 weight percent. The preferred paint thickener is a combination of attapulgite clay and xanthan gum. The attapulgite clay is an insoluble thickener, and should be present in an amount between about 0.5 and 3.0 weight percent. The xanthan gum is a water soluble thickener and should be present in an amount between about 0.1 and 0.5 weight percent. Although either thickener may be used alone, it is preferred to use both.

Instead of the attapulgite clay, other suitable non-soluble thickeners would include bentonite and montmorillonite.

Instead of xanthan gum, other suitable water soluble thickeners would include alkali metal alginates and carboxy methyl cellulose.

The following examples illustrate the invention:

EXAMPLE 1

| Yellow stain-free tempera paint | |
| --- | --- |
| Water | 33.65% |
| Sodium pyrophosphate | 0.14% |
| Diatomaceous silica | 11.18% |
| FD & C Yellow #5 (Colored pigment) | 1.24% |
| 11% Casein solution | 7.45% |
| 11% Starch Solution | 18.63% |
| Titanium dioxide | 0.25% |
| Calcium carbonate (Whiting) | 15.53% |
| Glucose plasticiser | 6.71% |
| Glycerin plasticiser | 3.11% |
| Attapulgite clay | 0.87% |
| Preservative | 0.12% |
| Xanthan gum | 0.19% |
| Sodium bicarbonate | 0.93% |
| Total | 100.00% |

In order to prepare the composition of Example 1, the pigment is first added to the casein solution in a high speed mixer with the speed kept low to avoid air entrapment. Sufficient diatomaceous silica is then added to the mixture and the mixer speed is gradually increased. After 10 to 15 minutes, a sample of the mixture is checked for fineness of pigment grind.

When the grind is satisfactory, the glucose and glycerine plasticizer are added and the mixer speed is slowed. At low mixing speed, water, sodium pyrophosphate, any remaining silica, titanium dioxide, whiting, preservative and attapulgite clay are added. The mixture is then stirred at a moderate speed until homogeneous.

Finally, xanthan gum, the starch solution and sodium bicarbonate are added.

| Light Blue | |
| --- | --- |
| Water | 32.61% |
| Sodium Pyrophosphate | 0.14% |
| Diatomaceous Silica | 11.39% |
| FD & C Blue #1 | 0.89% |
| Casein Solution | 6.52% |
| Starch Solution | 21.90% |
| Titanium Dioxide | 0.17% |
| Whiting | 14.55% |
| Glucose | 6.83% |
| Glycerine | 2.90% |
| Attapulgite | 0.89% |
| Preservative | 0.11% |
| Xanthan Gum | 0.20% |
| Sodium Bicarbonate | 0.90% |
| Total | 100.00% |

The composition of Example 2 is prepared in the same manner as the composition of Example 1.

| Green | |
| --- | --- |
| Water | 32.60% |
| Sodium Pyrophosphate | 0.14% |
| Diatomaceous Silica | 11.30% |
| FD & C Blue #1 | 0.57% |
| FD & C Yellow #5 | 1.82% |
| Casein Solution | 5.39% |
| Starch Solution | 21.73% |
| Titanium Dioxide | 0.19% |
| Whiting | 14.44% |
| Glucose | 6.78% |
| Glycerine | 2.97% |
| Attapulgite | 0.88% |
| Preservative | 0.10% |

-continued

| Green | |
|---|---|
| Xanthan Gum | 0.20% |
| Sodium Bicarbonate | 0.89% |
| Total | 100.00% |

The compositon of Example 3 is prepared in the same manner as the composition of Example 1.

EXAMPLE 4

| Red | |
|---|---|
| Casein Solution | 9.72% |
| Sodium Pyrophosphate | 0.15% |
| Barium Lithol | 0.35% |
| Clarion Red | 0.14% |
| Diatomaceous Silica | 3.20% |

The mixture is ground on a suitable grinding mill. It is then weighed and transferred to a high-speed mixer. The following ingredients are then added.

| | |
|---|---|
| Water | 30.00% |
| Whiting | 13.30% |
| Diatomaceous Silica (Balance) | 6.80% |
| Glucose | 10.95% |
| Glycerine | 3.14% |
| Attapulgite | 0.80% |
| Starch Solution | 20.17% |
| Preservative | 0.11% |
| Xanthan Gum | 0.27% |
| Sodium Bicarbonate | 0.90% |
| Total | 100.00% |

It will thus be sen that the objects set forth above, among those made apparent from the preceding description, are efficiently obtained, and since certain changes may be made in the above product without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statemens of the scope of the invention which, as a matter of language, might be said to fall therebetween.

What is claimed is:

1. A tempera paint composition which does not permanently stain an article of clothing comprising:
   a exotic pigment in an amount between about 0.8 and 2.0 weight percent;
   a carbon dioxide liberating substance in an amount between about 01.5 and 2.0 weight percent;
   a plasticizer in an amount between about 5 and 15 weight percent;
   a pigment extender in an amount between about 10 and 30 weight percent;
   a pH buffer in an amount between about 0.05 and 0.25 weight percent;
   a binder in an amount between about 5 and 50 weight percent;
   a preservative in an amount between about 0.1 and 0.25 weight percent; and
   wherein the balance of the composition is water.

2. The composition of claim 1, wherein said pigment is selected from the group consisting of D & C Yellow No. 5, Clarion Red, Barium Lithol, D & C Blue No. 1, D & C Red No. 27, Victoria Blue Lake, Prussian Blue, Lithol Rubine, D & C Yellow No. 6, FD & C Blue No. 2, Acid Violet 4 BNS, Calcium Lithol and Titanium Dioxide.

3. The composition of claim 1, wherein said carbon dioxide liberating substance is an alkali metal bicarbonate.

4. The composition of claim 3, wherein said metal bicarbonate is selected from the group consisting of sodium bicarbonate, potassium bicarbonate and strontium bicarbonate.

5. The composition of claim 1, wherein said carbon dioxide liberating substance has a pH between about 5.5 and 8.5 weight percent.

6. The composition of claim 1, wherein said pigment extender is selected from diatomaceous silica, silica clays, and non-clay extenders.

7. The composition of claim 6, wherein said pigment extender is diatomaceous silica present in an amount between about 10 and 15 weight percent.

8. The composition of claim 7, wherein said pigment extender further comprises at least one of silica clays and non-clay extenders present in an amount between about 10 and 18 weight percent.

9. The composition of claim 8, wherein said silica clay is china clay and said non-clay extender is selected from the group consisting of barium sulfate and calcium carbonate.

10. The composition of claim 1, wherein said binder is chosen from the group consisting of starch solution, dextrin, acrylics and natural gums.

11. The composition of claim 1, wherein said plasticizer is a combination of glucose plasticizer and glycerine plasticizer.

12. The composition of claim 1, wherein said pH buffer is an alkali metal phosphate.

13. The composition of claim 12, wherein said alkali metal phosphate is sodium pyrophosphate.

14. The composition of claim 1, wherein said preservative is selected from the group consisting of glutaraldehyde, benzoic acid, para-chloro-meta-xylenol and other phenolic derivatives.

15. The composition of claim 1, further including a liquid protein in an amount between about 5 and 10 weight percent.

16. The composition of claim 15, wherein said said protein is chosen from the group consisting of casein solution, keratin solution and albumin solution.

17. The composition of claim 1, further including an opacifier in an amount up to about 15 weight percent.

18. The composition of claim 17, wherein said opacifier is chosen from the group consisting of titanium dioxide, lithopone, barium sulfate and zinc oxide.

19. The composition of claim 1, further including a paint thickener present in an amount between about 0.6 and 3.5 weight percent.

20. The composition of claim 19, wherein said thickeners are selected from water-soluble thickeners and non-water soluble thickeners.

21. The composition of claim 20, wherein said water soluble thickener is xanthan gum in an amount between about 0.1 and 0.5 weight percent and said non-water soluble thickener is attapulgite clay in an amount between about 0.5 and 3.0 weight percent.

* * * * *